US006846780B2

(12) United States Patent
Giraud et al.

(10) Patent No.: US 6,846,780 B2
(45) Date of Patent: Jan. 25, 2005

(54) SILOXANE-BASED LUBRICANT COMPOSITION, NOT RELEASING HYDROGEN, PREPARATION METHOD AND USE THEREOF

(75) Inventors: Yves Giraud, Sainte Foy lès Lyon (FR); Gérald Guichard, Givors (FR); Ian Hawkins, Vaugneray (FR)

(73) Assignee: Rhodia Chimie, Courbevoie (FR)

( * ) Notice: Subject to any disclaimer, the term of this patent is extended or adjusted under 35 U.S.C. 154(b) by 154 days.

(21) Appl. No.: 10/149,584

(22) PCT Filed: Dec. 14, 2000

(86) PCT No.: PCT/FR00/03516

§ 371 (c)(1),
(2), (4) Date: Sep. 4, 2002

(87) PCT Pub. No.: WO01/44416

PCT Pub. Date: Jun. 21, 2001

(65) Prior Publication Data

US 2003/0109386 A1 Jun. 12, 2003

(30) Foreign Application Priority Data

Dec. 17, 1999 (FR) .............................................. 99 16006

(51) Int. Cl.$^7$ ............................................ C10M 173/02
(52) U.S. Cl. ...................... 508/201; 508/204; 508/208; 508/213; 106/38.22
(58) Field of Search ................................. 508/201, 204, 508/213, 208; 106/38.22

(56) References Cited

U.S. PATENT DOCUMENTS 4,533,305 A * 8/1985 Comper et al. ............... 425/43
4,554,122 A    11/1985 Allardice
RE32,318 E  * 12/1986 Comper et al. ........... 106/38.22
4,840,742 A  *  6/1989 Hoffman ...................... 508/143
4,863,650 A  *  9/1989 Kohler et al. ................. 264/39
5,152,950 A  * 10/1992 Ona et al. .................... 264/315
5,321,075 A  *  6/1994 Liles ........................... 524/837
5,431,832 A  *  7/1995 Crowe et al. ............... 508/208

FOREIGN PATENT DOCUMENTS

| EP | 0 206 314 | 12/1986 |
| EP | 0 279 372 | 8/1988 |
| EP | 0 635 559 | 1/1995 |
| FR | 2 494 294 | 5/1982 |

* cited by examiner

Primary Examiner—Jerry D. Johnson
(74) Attorney, Agent, or Firm—Burns, Doane, Swecker & Mathis, L.L.P.

(57) ABSTRACT

The invention concerns a lubricating composition, in the form of an oil-in-water emulsion, based on siloxane and not releasing hydrogen comprising: (a) a polydiorganosiloxane oil non-reactive to the lubricating properties having a dynamic viscosity of the order of $5.10^{-2}$ to $30.10^2$ Pa.s at 25° C.: (b) a reactive linear polydiorganosiloxane oil having per molecule at least two OH groups, said polydiorganosiloxane having a dynamic viscosity at 25° C. ranging between $5.10^{-2}$ to $30.10^2$ Pa.s: (c) a crosslinking agent soluble in the silicone phase comprising at least two functions capable of reacting with the reactive polydiorganicsiloxane oil (b); (d) a water soluble crosslinking agent: (e) a surfactant: (f) a condensation catalyst capable of catalysing the reaction of oil (b) with the crosslinking agent (c) and/or (d): and (g) water: compositions comprising a soluble polyorganosiloxane soluble in the silicone phase and bearing, before emulsification, condensable hydroxyl substitutes being excluded.

20 Claims, No Drawings

SILOXANE-BASED LUBRICANT COMPOSITION, NOT RELEASING HYDROGEN, PREPARATION METHOD AND USE THEREOF

The invention relates to a lubricant composition that is particularly suitable for lubricating the vulcanization bags used for molding and vulcanizing tire or semi-tire casings.

The invention also relates to vulcanization bags coated with a lubricant composition according to the invention, and also to the tire or semi-tire casings coated with said lubricant composition.

According to two other aspects, the invention relates to a process for preparing the lubricant compositions of the invention and also to the use of said lubricant compositions for lubricating vulcanization bags.

Rubber tires for vehicles are usually manufactured by molding and vulcanizing an uncured, or nonvulcanized and nonmolded tire cover, in a molding press in which the uncured tire cover is pressed outward against the surface of a mold by means of a bag that can be dilated with an inner fluid. By this process, the uncured tire cover is molded against the outer surface of the mold which defines the tread pattern of the tire cover and the configuration of the side walls. On heating, the the cover is vulcanized. In general, the bag is dilated by the inner pressure supplied by a fluid such as a hot gas; hot water and/or steam, which itself also participates in the heat transfer for the vulcanization. The tire cover is then left to cool slightly in the mold, this cooling occasionally being promoted by introducing cold or cooler water into the bag. The mold is then opened, the bag is deflated by releasing the pressure of the inner fluid and the tire cover is removed from the tire cover mold. This use of tire cover vulcanization bags is well known in the art.

It is accepted that an appreciable relative movement takes place between the outer contact surface of the bag and the inner surface of the tire cover during the dilation phase of the bag before complete vulcanization of the tire cover. Similarly, a considerable relative movement also takes place between the outer contact surface of the bag and the vulcanized inner surface of the tire cover, after the tire cover has been molded and vulcanized, during the deflation and removal of the bag from the tire.

If adequate lubrication is not provided between the bag and the inner surface of the tire cover, the bag generally has a tendency to warp, which results in deformation of the tire cover in the mold and also to excessive wear and tarnishing of the surface of the bag itself. The surface of the bag also ends to stick to the inner surface of the tire cover after vulcanization of the tire cover and during the part of the tire cover vulcanization cycle during which the bag is deflated. In addition, air bubbles may be trapped between the surfaces of the bag and the tire cover, and promote the appearance of vulcanization defects of the tire covers resulting from an inadequate heat transfer.

For this reason, the outer surface of the bag or the inner surface of the uncured or nonvulcanized tire cover is coated with a suitable lubricant, sometimes known as a "lining cement".

Many lubricant compositions have been proposed for this purpose in the art.

The lubricant compositions described in FR 2 494 294 are especially known, which contain, as main constituents, a reactive polydimethylsiloxane preferably containing hydroxyl end groups, a crosslinking agent preferably comprising Si—H functions and optionally a polycondensation catalyst.

Examples of crosslinking agents containing Si—H function(s) are methylhydrogenosilane, dimethylhydrogenosilane and polymethylhydrogenosilane. The drawback of lubricant compositions of this type is their instability on storage. Specifically, it is found that the emulsion undergoes creaming following the release of hydrogen during the transportation and storage of the lubricant compositions. The release of hydrogen responsible for the instability of the compositions of the prior art results essentially from the decomposition of the constituents containing Si—H function(s).

The preparation of lubricant compositions from constituents not comprising the Si—H function, but nevertheless having excellent durability, lubrication and elasticity properties is thus highly desirable.

The compositions forming the subject of EP 635 559 are siloxane-based lubricant compositions that partly satisfy these requirements. These compositions are especially more stable in that they do not evolve hydrogen during storage.

These compositions, which are in the form of emulsions, comprise as essential constituents an unreactive polydimethylsiloxane, a reactive poly-dimethylsiloxane, preferably containing hydroxyl or alkoxy end groups, and a crosslinking agent. However, their durability is insufficient for a practical use in the production of tire or semi-tire casings.

The present invention provides an improved lubricant composition that does not release hydrogen and that in addition has excellent durability characteristics, which makes them entirely suitable for lubricating the bags used for vulcanizing tire and semi-tire casings.

The lubricant composition of the invention is a siloxane-based oil-in-water emulsion that does not release hydrogen. This composition more specifically comprises:

(a) an unreactive polydiorganosiloxane oil with lubricant properties, having a dynamic viscosity from about $5 \times 10^{-2}$ to $30 \times 10^2$ Pa.s at 25° C.;

(b) a reactive linear polydiorganosiloxane oil containing at least two OH groups per molecule, said polydiorganosiloxane having a dynamic viscosity at 25° C. of between $5 \times 10^{-2}$ and $30 \times 10^2$ Pa.s;

(c) a crosslinking agent that is soluble in the silicone phase, comprising at least two functions capable of reacting with the reactive polydiorganosiloxane oil (b);

(d) a water-soluble crosslinking agent chosen from hydroxylated silanes and/or polydiorganosiloxanes, said crosslinking agent bearing at least one hydroxyl group and at least one organic group containing an Fr function per molecule, Fr representing an optionally substituted amino, epoxy, optionally substituted methacroyl, optionally substituted acroyl, optionally substituted ureido, optionally substituted thiol or halo function;

(e) a surfactant;

(f) a condensation catalyst capable of catalyzing the reaction of the oil (b) with the crosslinking agent (c) and/or (d); and (g) water, said composition comprising:

from 5 to 95 parts by weight of the constituent (a);
from 1 to 50 parts by weight of the constituent (b);
from 0.1 to 20 parts by weight of the constituent (c);
from 0.5 to 15 parts by weight of the constituent (d);
from 0.05 to 10 parts by weight of the constituent (f);
per 100 parts by weight of the sum of the constituents (a)+(b)+(c)+(d)+(f);
the amounts of surfactants and of water being sufficient to obtain an oil-in-water emulsion.

Compositions comprising a polyorganosiloxane resin that is soluble in the silicone phase and bearing, before emulsification, condensable hydroxyl substituents are excluded from the subject of the invention.

Constituents (a), (b), (c), (d), (e) and (f) of the emulsion are defined with reference to their initial chemical structure, i.e. the structure that characterizes them before emulsification. Provided that they are in aqueous medium, their structure is capable of being greatly modified following hydrolysis and condensation reactions.

In the context of the invention, the expression "dynamic viscosity" means the viscosity of Newtonian type, i.e. the dynamic viscosity, measured in a manner that is known per se at a given temperature and at a given shear rate gradient that is low enough for the measured viscosity to be independent of the rate gradient.

The unreactive polydiorganosiloxane oil (a) has a dynamic viscosity generally of between $5\times10^{-2}$ and $30\times10^{2}$ Pa.s at 25° C. Preferably, the dynamic viscosity ranges between $5\times10^{-2}$ and 30 Pa.s and better still between 0.1 and 5 Pa.s.

In the context of the invention, the term "unreactive" means an oil which does not react chemically with any of the constituents of the composition under the conditions for emulsifying or preparing the lubricant composition and under the working conditions.

Preferred constituents (a) that may be mentioned include linear polydiorganosiloxanes with a repeating unit of formula $V_1V_2SiO_{2/2}$, ending at its chain ends with units $V_3V_4V_5SiO_{1/2}$, $V_1$, $V_2$, $V_3$, $V_4$ and $V_5$, which may be identical or different, representing a monovalent organic group chosen from alkyl, alkenyl, aryl, cycloalkyl, cycloalkenyl, aralkyl and alkaryl.

In these oils, "alkyl" denotes a saturated, linear or branched, preferably $C_1$–$C_6$ hydrocarbon-based group (such as methyl, ethyl or propyl); "alkenyl" denotes a linear or branched, preferably $C_2$–$C_8$ hydrocarbon-based group containing ethylenic unsaturation(s) (such as vinyl, allyl or butadienyl); "aryl" denotes a monocyclic or polycyclic aromatic, preferably $C_6$–$C_{10}$ hydrocarbon-based group (such as phenyl or naphthyl); "cycloalkyl" denotes a saturated monocyclic or polycyclic, preferably $C_3$–$C_8$ carbocyclic group (such as cyclohexyl); "cycloalkenyl" denotes a cycloalkyl group, preferably $C_6$–$C_8$, containing one or more unsaturations (such as cyclohexenyl); "aralkyl" denotes, for example, benzyl; "alkaryl" denotes, for example, tolyl or xylyl. More generally, "alkaryl" and "aralkyl" denote groups in which the aryl and alkyl portions are as defined above.

Advantageously, the substituents $V_1$, $V_2$, $V_3$, $V_4$ and $V_5$ are identical.

Preferably, the constituent (a) is an unfunctionalized linear polydimethylsiloxane, i.e. containing repeating units of formula $(CH_3)_2SiO_{2/2}$ and having $(CH_3)_3SiO_{1/2}$ units at its two ends.

The constituent (a) is generally introduced into the composition in a proportion of from 5 to 95 parts by weight per 100 parts by weight of the mixture of constituents (a)+(b)+(c)+(d)+(f), preferably in a proportion of from 50 to 95 and better still in a proportion of from 65 to 85.

The composition of the invention also comprises a reactive linear polydiorganosiloxane oil (b).

In the context of the invention, the term "reactive" denotes the reactivity of the constituent (b) with respect to the crosslinking agents (c) and/or (d) present in the composition.

Preferably, the component (b) reacts with the crosslinking agent under the conditions for preparing the emulsion.

The organic substituents of the oil (b) are saturated or unsaturated, linear or branched aliphatic radicals preferably containing from 1 to 10 carbon atoms; saturated, unsaturated or aromatic monocyclic or polycyclic carbocyclic radicals preferably containing from 3 to 18 carbon atoms and better still from 5 to 10 carbon atoms; or radicals containing both an aliphatic portion and a carbocyclic portion.

These aliphatic and/or carbocyclic radicals are optionally substituted with —OH and/or amino (optionally substituted) and/or halo and/or cyano radicals. The substituent on the amino group may be an aliphatic radical or a carbocyclic radical, or may comprise both an aliphatic portion and a carbocyclic portion, the aliphatic and carbocyclic radicals being as defined above.

Halogens that may be mentioned include chlorine, fluorine, bromine and iodine, fluorine being more specifically suitable.

Advantageously, the organic groups of the oil (b) are alkyl groups, preferably $C_1$–$C_6$; cycloalkyl, preferably $C_3$–$C_8$; aryl, preferably $C_6$–$C_{10}$ (and for example phenyl); or $C_2$–$C_6$ alkenyl (for example allyl or vinyl); said groups optionally being substituted with hydroxyl and/or amino (optionally substituted) and/or halo and/or cyano.

The substituents on the amino group are, for example, alkyl, such as $(C_1$–$C_{10})$alkyl; alkenyl, such as $(C_2$–$C_8)$ alkenyl; aryl, such as $(C_6$–$C_{10})$ aryl; cycloalkyl, such as $(C_3$–$C_8)$cycloalkyl.

A preferred group of components (b) consists of oils of formula:

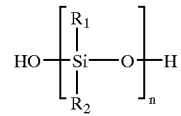

in which n is an integer greater than or equal to 10, $R_1$ and $R_2$, which may be identical or different, represent —OH; alkyl, especially $(C_1$–$C_6)$alkyl; cycloalkyl, especially $(C_3$–$C_8)$cycloalkyl; alkenyl, especially $(C_2$–$C_6)$alkenyl; cycloalkenyl, especially $(C_5$–$C_8)$cycloalkenyl; or amino.

Preferably, $R_1$ and $R_2$ are independently chosen from $(C_1$–$C_6)$alkyl (such as methyl); $(C_6$–$C_{10})$aryl, and for example phenyl; $(C_2$–$C_6)$ alkenyl (such as vinyl); or amino; $(C_1$–$C_6)$alkylamino; or di$(C_1$–$C_6)$alkylamino; each of the alkyl and aryl groups optionally being substituted with halo (and preferably fluoro) or cyano.

The oils (b) that are most used, on account of their availability in industrial products, are those for which $R_1$ and $R_2$ are independently chosen from methyl, ethyl, propyl, phenyl, vinyl and 3,3,3-tri-fluoropropyl. Very preferably, 80%, in numerical terms, of these radicals are methyl radicals.

In practice, the oils (b) that will be preferred are α,ω-dihydroxypolydimethylsiloxanes bearing $(CH_3)_2(OH)SiO_{1/2}$ units at the ends.

In the context of the present invention, it is especially possible to use the α,ω-dihydroxypolydi-organosiloxanes prepared by the anionic polymerization process described in the abovementioned U.S. patents: U.S. Pat. No. 2,891,920 and especially U.S. Pat. No. 3,294,725 (cited as reference).

The constituent (b) is preferably used in a proportion of from 5 to 40 parts by weight and better still in a proportion of from 10 to 30 parts by weight per 100 parts by weight of the mixture of constituents (a)+(b)+(c)+(d)+(f).

The crosslinking agent (c) that is soluble in the silicone phase comprises at least two functions capable of reacting with the oil (b) so as to bring about crosslinking of the oil. Advantageously, said reactive functions of the crosslinking agent (c) react with the oil (b) under the conditions for preparing the emulsion.

The crosslinking agent (c) preferably has the formula:

$$Y_a Si(Zi)_{4-a}$$

in which:

a is 1 or 2;

Y is a monovalent organic group; and the groups Zi, which may be identical or different, are chosen from $-OX_a$;

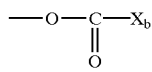

and $-O-N=CX_1X_2$ in which $X_a$, $X_b$, $X_1$ and $X_2$ are, independently, linear or branched, saturated or unsaturated, preferably $C_1-C_{20}$ (for example $C_1-C_{10}$) aliphatic hydrocarbon-based radicals; it being understood that $X_1$ and $X_2$ may also represent hydrogen and that $X_a$ is a radical optionally substituted with ($C_1-C_{10}$)alkoxy.

According to one preferred embodiment of the invention, a represents 1, such that the crosslinking agent (c) has the formula: $YSi(Zi)_3$.

Also preferably, the groups Zi are identical.

A preferred group of crosslinking agents (c) is formed by the set of organotrialkoxysilanes, organotriacyloxysilanes, organotrioximosilanes and tetraalkyl silicates.

More generally, as regards the symbol Y, the expression "monovalent organic group" especially encompasses saturated or unsaturated, linear or branched $C_1-C_{30}$ aliphatic radicals; monocyclic or polycyclic, saturated, unsaturated or aromatic $C_6-C_{30}$ carbocyclic radicals; and also radicals containing both an aliphatic portion as defined above and a carbocyclic portion as defined above; each of these radicals optionally being substituted with an amino, epoxy, thiol or ester function.

Examples of groups Y are, more particularly, ($C_1-C_{10}$) alkyl, ($C_1-C_{10}$)alkoxy or ($C_2-C_{10}$)alkenyl radicals, optionally substituted with one of the following groups:

epoxy;

thiol;

($C_3-C_8$)cycloalkyl optionally substituted with epoxy;

($C_1-C_{10}$)alkylcarbonyloxy optionally substituted with epoxy;

($C_2-C_{10}$)alkenylcarbonyloxy optionally substituted with epoxy;

($C_3-C_8$)cycloalkylcarbonyloxy optionally substituted with epoxy;

($C_6-C_{10}$)arylcarbonyloxy;

$-R_a-NR'_1R'_2$ in which $R_a$ represents nothing or represents a linear or branched, saturated or unsaturated $C_1-C_{20}$ and preferably $C_1-C_{10}$ divalent aliphatic hydrocarbon-based radical, and for example ($C_1-C_{10}$)alkylene;

$R'_1$ and $R'_2$ independently represent H; a ($C_1-C_{20}$)alkyl and preferably ($C_1-C_{10}$)alkyl group; a ($C_3-C_8$) cycloalkyl group; or a ($C_6-C_{10}$)aryl group, preferably phenyl;

$-R_b-NH-R_c-NR'_1R'_2$ in which $R_b$ and $R_c$, which may be identical or different, are as defined for $R_a$ above; and $R'_1$ and $R'_2$ are as defined above;

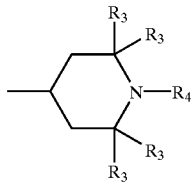

in which $R_3$ represents $C_1-C_{20}$ alkyl, better still ($C_1-C_{10}$)alkyl, for example ($C_1-C_3$)alkyl and especially methyl;

($C_6-C_{20}$)aryl, better still ($C_6-C_{10}$)aryl, for example phenyl; or arylalkyl in which the aryl and alkyl portions are as defined above;

$R_4$ represents a hydrogen atom; $C_1-C_{20}$ alkyl, better still ($C_1-C_{12}$)alkyl, for example methyl; $C_2-C_{21}$ alkylcarbonyl, better still ($C_2-C_{13}$)alkylcarbonyl; ($C_6-C_{20}$)aryl, better still ($C_6-C_{10}$)aryl, for example phenyl; or aralalkyl and preferably ($C_6-C_{10}$)aryl ($C_1-C_{12}$)alkyl; or alternatively $R_4$ represents O;

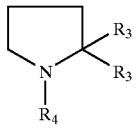

in which $R_3$ and $R_4$ are as defined above.

It is preferable for $R_3$ to represent methyl, phenyl or benzyl and for $R_4$ to represent H or methyl.

Preferably also, Y is unsubstituted ($C_2-C_{10}$)alkenyl; or ($C_1-C_{10}$)alkyl optionally substituted with a group chosen from:

thiol;

($C_1-C_{10}$)alkylcarbonyloxy optionally substituted with epoxy;

($C_3-C_8$)cycloalkyl optionally substituted with epoxy;

($C_2-C_{20}$)alkenylcarbonyloxy; and $-R_a-NR'_1R'_2$ in which $R_a$ represents nothing or represents ($C_1-C_6$)alkylene and $R'_1$ and $R'_2$ independently represent H, ($C_3-C_8$)cycloalkyl or ($C_6-C_{10}$)aryl and especially phenyl.

By way of example, Y represents aminopropyl, ethylaminopropyl, n-butylaminoethyl, cyclohexylaminopropyl, phenylaminoethyl, N-aminoethylaminopropyl, dimethylaminopropyl, glycidyloxypropyl, 3,4-epoxycyclohexylethyl, mercaptopropyl, methacryloxypropyl, methyl, ethyl or vinyl.

The groups Zi are advantageously chosen from ($C_1-C_{10}$) alkoxy; ($C_2-C_{10}$)alkoxy ($C_1-C_{10}$)alkoxy; ($C_1-C_{10}$) alkylcarbonyloxy; or an oxime group $-O-N=CX_1X_2$ in which $X_1$ and $X_2$ are independently H or ($C_1-C_{10}$)alkyl.

Preferably, Zi represents methoxy, ethoxy, propoxy, methoxyethoxy, acetoxy or an oxime group.

A particularly preferred group of constituents (c) is formed by the alkyltrialkoxysilanes of formula $YSi(Zi)_3$ in which Y is alkyl, especially ($C_1-C_{30}$)alkyl (preferably ($C_1-C_{10}$)alkyl) and Zi is alkoxy, especially ($C_1-C_{20}$)alkoxy and preferably ($C_1-C_{10}$)alkoxy.

Among these, mention may be made of methyltrimethoxysilane and methyltriethoxysilane.

Other suitable crosslinking agents (c) are described in U.S. Pat. No. 4,889,770, such as:

beta-aminoethyltrimethoxysilane,
beta-aminoethyltriethoxysilane,
beta-aminoethyltriisopropoxysilane,
gamma-aminopropyltrimethoxysilane,
gamma-aminopropyltriethoxysilane,
gamma-aminopropyltri(n-propoxy)silane,
gamma-aminopropyl(n-butoxy)silane,
delta-aminobutyltrimethoxysilane,
epsilon-aminohexyltriethoxysilane,
4-aminocyclohexyltriethoxysilane,
4-aminophenyltrimethoxysilane,
N-aminoethyl-gamma-aminopropyltrimethoxysilane,
N-aminoethyl-gamma-aminopropyltriethoxysilane,
beta-glycidoxyethyltrimethoxysilane,
beta-glycidoxyethyltriethoxysilane,
gamma-glycidoxypropyltriethoxysilane,
beta-(3,4-epoxycyclohexyl)ethyltrimethoxysilane,
beta-(3,3-epoxycyclohexyl)ethyltriethoxysilane,
gamma-(3,4-epoxycyclohexyl)propyltriethoxysilane,
gamma-mercaptopropyltrimethoxysilane,
gamma-mercaptopropyltriethoxysilane,
gamma-methacryloxypropyltrimethoxysilane,
gamma-methacryloxypropyltriethoxysilane,
methyltrimethoxysilane,
ethyltriethoxysilane,
vinyltrimethoxysilane,
allyltrimethoxysilane, and the corresponding compounds in which the alkoxy groups have been replaced with alkylcarbonyloxy or oxime groups.

The lubricant composition comprises from 0.1 to 20 parts by weight, per one hundred parts by weight of the sum of the constituents (a)+(b)+(c)+(d)+(f), of the crosslinking agent (c), preferably from 0.2 to 10 parts by weight and better still from 0.5 to 5.

The water-soluble crosslinking agent (d) is chosen from hydroxylated silanes and/or polydiorganosiloxanes, said crosslinking agent bearing, per molecule, at least one hydroxyl group and at least one organic group containing a function Fr, Fr representing an optionally substituted amino, epoxy, optionally substituted acroyl ($CH_2=CH-CO$), optionally substituted methacroyl ($-CH_2=C(CH_3)-CO-$), optionally substituted ureido ($NH_2-CO-NH-$), optionally substituted thiol or halo function.

For the purposes of the present invention, the term "water solubility" should be understood as meaning the ability of a product to dissolve in water at a temperature of 25° C., to a proportion of at least 5% by weight.

The organic substituents of the crosslinking agent (d) other than the organic group(s) containing a function Fr are saturated or unsaturated, linear or branched aliphatic radicals preferably containing from 1 to 10 carbon atoms; monocyclic or polycyclic, saturated, unsaturated or aromatic carbocyclic radicals preferably containing from 3 to 18 carbon atoms and better still from 5 to 10 carbon atoms; or radicals containing both an aliphatic portion and a carbocyclic portion.

According to one preferred embodiment of the invention, Fr is an amino function.

Thus, a preferred organic group containing a function Fr is a group of formula $-R_a-NR'_1R'_2$;

$-R_b-NH-R_c-NR'_1R'_2$;

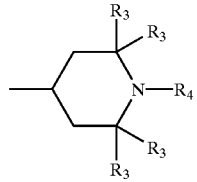

and

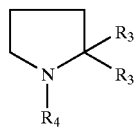

in which $R_a$, $R_b$, $R_c$, $R'_1$, $R'_2$, $R_3$ and $R_4$ are as defined above.

According to one preferred embodiment of the invention, the water-soluble crosslinking agent has the formula:

$$R'_2R'_1N-R_a-Si(OH)_3$$

in which $R_a$, $R'_1$ and $R'_2$ are as defined above. More preferably, $R_a$ represents alkylene, especially ($C_2-C_6$) alkylene, and $R'_1$ and $R'_2$ independently represent a hydrogen atom or an alkyl group, especially ($C_1-C_6$) alkyl.

By way of example, mention may be made of 3-aminopropyltrihydroxysilane.

The water-soluble crosslinking agent may be a linear and/or cyclic hydroxylated polydiorganosiloxane containing siloxyl units MD and/or D, and/or a hydroxylated polydiorganosiloxane resin containing in its structure siloxyl units T optionally combined with units M and/or D and/or Q, or alternatively siloxyl units Q combined with units M and/or D.

This linear, cyclic or network polydiorganosiloxane is not substituted with hydrolyzable organic functions such as alkoxy functions.

In these polydiorganosiloxanes, the siloxyl units M, D, T and Q are defined as follows:

unit $M=G_3SiO_{1/2}$
unit $D=G_2SiO_{2/2}$
unit $T=GSiO_{3/2}$
unit $Q=SiO_{4/2}$, G being an organic substituent as defined above for the crosslinking agent (d), or representing hydroxyl or being a function Fr, it being understood that, in each molecular structure, at least one of the symbols G represents a hydroxyl group and at least one other of the symbols G represents a function Fr.

Preferably, G is alkyl, especially ($C_1-C_6$)alkyl (for example methyl, ethyl, isopropyl, tert-butyl or n-hexyl), hydroxyl, alkenyl (for example vinyl or allyl) or a function Fr, the preferred functions Fr being as defined above.

As a linear hydroxylated polydiorganosiloxane that may be used as a crosslinking agent (d), mention may be made of polymethylsiloxane in which the two end groups comprise a hydroxyl and in which each silicon atom of the chain bears a function Fr.

This constituent (d) is used in a proportion of from 0.5 to 15 parts by weight per one hundred parts by weight of the sum of the constituents (a)+(b)+(c)+(d)+(f), preferably in a proportion of from 0.6 to 5 parts by weight and better still in a proportion of from 0.8 to 3 parts by weight.

The nature of the surfactant (e) will be readily determined by a person skilled in the art, the objective being to prepare a stable emulsion.

The anionic, cationic, nonionic and zwitterionic surfactants may be used alone or as a mixture.

Anionic surfactants that may be mentioned include alkali metal salts of aromatic hydrocarbon-based sulfonic acids or alkali metal salts of alkylsulfuric acids.

Nonionic surfactants are more particularly preferred in the context of the invention. Among these, mention may be made of alkyl or aryl ethers of poly(alkylene oxide), polyoxyethylenated sorbitan hexastearate, polyoxyethylenated sorbitan oleate with a saponification number of from 102 to 108 and a hydroxyl number of from 25 to 35, and cetylstearyl ethers of poly(ethylene oxide).

As aryl ethers of poly(alkylene oxide), mention may be made of polyoxyethylenated alkylphenols. As alkyl ethers of poly(alkylene oxide), mention may be made of polyethylene glycol isodecyl ether and polyethylene glycol trimethylnonyl ether containing from 3 to 15 ethylene oxide units per molecule.

The amount of surfactant (e) depends on the type of each of the constituents present and also on the actual nature of the surfactant used. As a general rule, the composition comprises from 0.5% to 10% by weight of surfactant (better still from 0.5% to 5% by weight) and from 40% to 95% by weight of water (g) (better still from 45 to 90% by weight).

The lubricant composition of the invention also comprises a condensation catalyst (f) chosen from those conventionally used in the art for catalyzing the crosslinking of oils of the type (b) using crosslinking agents of the type (c) and/or (d) defined above.

Examples of catalysts that may be used in the context of the invention are organometallic salts and titanates such as tetrabutyl orthotitanate. Organometallic salts that may be mentioned include zirconium naphthenate and zirconium octylate.

Said catalyst is preferably a catalytic tin compound, generally an organotin salt.

The organotin salts that may be used are described in particular in Noll's Chemistry and Technology of Silicones, Academic Press (1968), page 337. Compounds that may also be defined as catalytic tin compounds include either distannoxanes or polyorganostannoxanes or the reaction product of a tin salt, in particular of a tin dicarboxylate, with polyethyl silicate, as described in patent U.S. Pat. No. 3,862,919.

The reaction product of an alkyl silicate or of an alkyltrialkoxysilane with dibutyltin diacetate, as described in Belgian patent BE 842 305, may also be suitable for use.

According to another possibility, use is made of a tinII salt, such as $SnCl_2$ or stannous octoate.

Advantageously, the catalyst is the tin salt of an organic acid, such as dibutyltin diacetate, dibutyltin dilaurate, dioctyltin dilaurate, dibutyltin dioctate, zinc naphthenate, cobalt naphthenate, zinc octylate, cobalt octylate or dioctyltin bis(isomercaptoacetate).

The preferred tin salts are tin bischelates (EP 147 323 and EP 235 049), diorganotin dicarboxylates, and in particular dibutyltin or dioctyltin diversatates (British patent GB 1 289 900, dibutyltin or dioctyltin diacetate, dibutyltin or dioctyltin dilaurate or the hydrolysis products of precipitated species (for example diorgano- and polystannoxanes).

The catalyst (f) is introduced into the lubricant composition in a proportion of from 0.05 to 10 parts by weight per one hundred parts by weight of the sum of the constituents (a)+(b)+(c)+(d)+(f), preferably in a proportion of from 0.08 to 5.parts by weight and better still from 0.1 to 2 parts by weight.

Dioctyltin dilaurate is most particularly preferred.

The lubricant composition according to the present invention can also contain one or more additional ingredients such as film-forming polymers, additional lubricants and anti-friction agents, coalescers, wetting agents or dispersants, air evacuation agents, antifoams, thickeners, stabilizers, preserving agents such as biocides and antifungal agents, in amounts that can vary considerably, for example between 0.2% and 50% by weight of the composition.

Examples of film-forming polymers that may be mentioned include styrene-acrylic copolymers.

Examples of thickeners are cellulosic thickeners (carboxymethylcellulose), acrylics, polyurethane, hydrocolloid gums (xanthan gum) and mixtures thereof.

Coalescers that may be used include glycol and/or aliphatic petroleum fractions (petroleum distillation fractions).

Wetting agents or dispersants that may be used in the context of the invention include, for example, phosphates and/or polyacrylics such as, for example, sodium hexametaphosphate and sodium polyacrylates.

The compositions of the invention may be prepared conventionally by carrying out standard methods of the prior art.

One advantageous process consists in emulsifying in water (g) a mixture of the lipophilic constituents (a), (b), (c) and (f), in the presence of the surfactant (e), these constituents being used in the form in which they are naturally found. Next, the missing constituent(s), namely constituent (d) and possibly the additional ingredient(s) is (are) added, either directly to the emulsion (in the case of the water-soluble constituents, such as (d)), or in the form of an aqueous emulsion (in the case of the constituents that are soluble in the silicone phase, such as, for example, a film-forming polymer).

Modifications to this process may naturally be envisioned.

According to a first modification, an aqueous emulsion of the lipophilic constituents (a), (b) and (c) is prepared as indicated above, in the presence or the surfactant (e), and the missing constituents, especially the constituents (d) and (f), are then added, either directly to the emulsion (in the case of constituent (d)), or in the form of an aqueous emulsion (in the case of constituent (f) and optionally, for example, of the film-forming polymer).

According to a second modification, an aqueous emulsion of the lipophilic constituents (a) and (c) is prepared as indicated above, in the presence of the surfactant (e), and the missing constituents, especially constituents (b), (d) and (f), are then added, either directly to the emulsion (in the case of constituent (d)), or in the form of an aqueous emulsion (in the case of constituents (b), (f) and optionally, for example, of the film-forming polymer).

The emulsification may be direct or may take place by inversion.

In the case where the process is performed by inversion, it may be advantageous to prepare a pre-emulsion containing only a small proportion of water, invert it (for example by grinding) and then dilute the remaining emulsion with the remaining water, to which one or more water-soluble constituents have optionally been added.

The possible emulsion of the reactive oil (b), when one is used, is preferably prepared in the presence or the same surfactant (e) as that used in the initial emulsification process. The possible emulsion of the catalyst (f) or of the additional ingredient is prepared preferably in the presence of another type of surfactant such as, for example, a polyvinyl alcohol.

The process of the invention is carried out at room temperature.

The process of the invention may also comprise an additional step of heating the resulting emulsion. This step allows the crosslinking process to be accelerated. According to one variant of the invention, the temperature may be increased up to 40° C. so as to accelerate the crosslinking of the constituents present.

This heating step may be replaced with a step of storing the emulsion at room temperature until crosslinking is complete.

The lubricant properties of the composition of the invention are markedly improved in the case of total crosslinking of the crosslinkable constituents of the composition.

The oils in (a) and (b) and also the crosslinking agents in (c) and (d) are commercially available or readily accessible to a person skilled in the art by carrying out standard processes described in the prior art.

When the oil (b) or the crosslinking agent (c) are functionalized, the functionalization is readily achieved by a suitable substitution or addition reaction.

When the crosslinking agent (d) represents a water-soluble silicone resin equipped with hydroxyl group(s) and group(s) Fr, this resin may be obtained:

by cohydrolysis:
of at least one silane ($S_1$) substituted with functions Fr and with Hydrolyzable OrganoFunctional, Substituents (HOFS), which may be identical or different, preferably —$OR_d$ with $R_d$=hydrocarbon-based radical, advantageously alkyl;
with at least one silane ($S_2$) substituted with HOFSs, which may be identical to or different than each other and relative to those of ($S_1$), with the exclusion of substituents Fr:

by heterocondensation of the hydrolysates derived from the silanes $S_1$ and $S_2$;

and then by "stripping" or steam entrainment of the hydrolysates derived from the HOFSs.

For the purposes of the invention, the hydrolyzable organofunctional substituents (HOFSs) that are capable of generating volatile organic compounds (VOCs) in situ during the crosslinking by condensation are, for example, alkoxy, acetoxy, ketiminoxy and enoxy.

Since the HOFSs that are the most common are alkoxy groups —$OR_d$, the heterocondensation mechanisms involved are of the OH/OH and OH/$OR_d$ type, these OH or $OR_d$ groups being borne by the hydrolysates derived from the silanes $S_1$ and $S_2$. The hydrolysates derived from the HOFSs are themselves alcohols, in this particular case.

Thus, in practice, the silane $S_1$ is advantageously a trialkoxysilane, preferably a trimethoxysilane, a triethoxysilane, a methyldimethoxysilane or a methyldiethoxysilane, bearing an amino function Fr of the type such as:

3-aminopropyl;
N-methyl-3-aminopropyl
N-aminoethyl-3-aminopropyl;
$C_6H_5CH_2NH(CH_2)_2NH—(CH_2)_3—$;
3-ureidopropyl;
3-(4,5-dihydroimidazol-1-yl)propyl;
3-methacryloxypropyl: $CH_2=C(CH_3)—COO—(CH_2)_3—$;
3-glycidyloxypropyl:

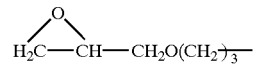

(the other substituents of Si in the crosslinking agent (d) being, in this case, free of HOFSs)

3-mercaptopropyl;
3-chloropropyl.

As regards $S_2$, the HOFSs that it comprises are preferably alkoxy radicals, advantageously $C_1$–$C_6$, for example: methoxy, ethoxy or propoxy.

This silane $S_2$, preferably an alkoxysilane, can also include at least one alkyl substituent, advantageously $C_1$–$C_6$, for example: methyl, ethyl, propyl.

These resins produced by heterocondensation of $S_1$ and $S_2$ are especially described in European patent application No. 0 675 128, the content of which is incorporated by reference in the present specification.

According to a second embodiment, the crosslinking agent (d) is a resin obtained:

by hydrolysis of a silane $S_3$ substituted with groups Fr and HOFS,
by homocondensation of hydrolyzed silanes $S_3$,
and by steam entrainment "stripping" of the hydrolysates derived from HOFSs.

The silane $S_3$ is preferably a substituted alkoxysilane Fr. It may be, for example, a trialkoxysilane for obtaining a hydroxylated resin containing units T, also known as a resin T(OH).

This silane $S_3$ may be of the same type as the silane $S_1$ as defined above. The functions Fr substituting $S_3$ correspond to the same definition as that given above.

As an illustration of this second embodiment of a crosslinking agent (d) of water-soluble polydiorganosiloxane resin type, mention may be made of the product obtained from γ-aminopropyltriethoxysilane hydrolyzed and subjected to a "stripping" operation of the ethanol formed by the hydrolysis. The homopolycondensed resin obtained is a mixture of oligomers containing from 4 to 10 silicon atoms and comprising the following units:

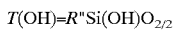

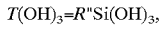

these units being present, respectively, in decreasing amount, with R"=$NH_2$—$(CH_2)$—$_3$. It is, for example, an amino resin T(OH).

The present invention also relates to articles lubricated using the lubricant composition of the invention and also to the use of the lubricant composition of the invention for lubricating various articles.

More particularly, the invention relates to:

a dilatable rubber bag coated on its outer surface with a composition according to the invention, for molding and vulcanizing tire or semi-tire casings;

a dilatable rubber bag that may be obtained by heating the dilatable bag defined above, especially to 80–150° C. (preferably 100–150° C.), so as to totally crosslink the crosslinkable constituents of the emulsion;

an uncured tire or semi-tire casing including elements that will constitute its outer tread intended to come Into contact with the ground, coated on its inner surface with a composition according to the invention;

the use of a lubricant composition according to the invention when molding and vulcanizing tire or semi-tire casings, to lubricate the dilatable rubber vulcanization bag.

The lubricant composition of the invention may be applied in any manner, and for example by spraying, by brushing or by using a sponge or a brush. It is preferable to perform the process so as to cover the article to be coated with a uniform coating layer.

The vulcanization bag used when vulcanizing tire or semi-tire casings may be lubricated in two different ways.

During the manufacture of the tire or semi-tire casings, an uncured casing is placed in a casing mold, a dilatable bag is placed in the mold, the mold is closed and the bag is dilated by applying an inner pressure of hot fluid, such that the casing is pressed against the mold, molded and vulcanized. The mold is then opened, the bag is deflated and the casing is recovered, molded and vulcanized. The same bag is used to manufacture a thousand casings.

The dilatable rubber bag used in the manufacture of the casings is initially coated with a composition according to the invention.

At the outset, the bag is lubricated directly. Next, a depletion of the lubricant effect of this bag occurs.

In this subsequent phase, it is the inner surface of the casing (that which comes into contact with the bag) which is coated with the lubricant composition. The lubrication of the rubber bag is regenerated by transfer from the casing.

In general, the mold pressing/bag release cycles carried out during the manufacture of the casings take place in the following manner:

the bag initially coated with the lubricant composition (direct lubrication) and heated to 80–150° C. is used without subsequent coating for 5 to 10 cycles (each cycle resulting in the manufacture of a different casing), and then the following cycles are carried out by using this same bag (for which the lubrication coating is depleted) starting with tire or semi-tire casings that are coated each time with the lubricant composition of the invention: in this case, the lubrication of the bag takes place by transfer.

The lubricant composition of the invention comprises no constituent containing an Si—H bond, such that there is no risk of evolution of hydrogen during storage or transportation.

The lubricant composition of the invention also has excellent durability, the lubricant properties being exerted over a long period.

The following examples which illustrate the invention demonstrate the excellent lubricant properties of the compositions of the invention.

EXAMPLE 1

This example illustrates a lubricant composition according to the invention.

The formulation of this composition, which is an oil-in-water emulsion, is given in the table below.

TABLE 1

| Nature of the constituent | Identification | Weight percentage in the emulsion |
|---|---|---|
| Linear polydimethylsiloxane containing $(CH_3)_3SiO_{1/2}$ end groups, with a dynamic viscosity equal to $10^{-1}$ Pa · s at 25° C. | Constituent (a) | 34.31 |
| α,ω-dihydroxypolydimethylsiloxane[1] | Constituent (b) | 11.60 |
| Methyltriethoxysilane | Constituent (c) | 0.321 |
| $NH_2$—$(CH_2)_3$—Si $(OH)_3$[2] | Constituent (d) | 2.5 |
| Polyethoxylated isotridecyl alcohol[3] | Constituent (e) | 2.71 |
| Dioctyltin dilaurate emulsion[4] | Constituent (f) | 0.25 |
| Bactericide | | 0.019 |
| Antioxidant | | 0.048 |
| Distilled water | | 48.236 |
| | | 100 |

[1]α, ω-dihydroxypolydimethylsiloxane reactive oil with a dynamic viscosity of 0.75 Pa · s at 25° C.
[2]Aqueous solution containing 23% by weight of silane.
[3]Mixture of 15% water and 85% isotridecyl alcohol ethoxylated with 8 to 9 mol of ethylene oxide per mole of isotridecyl alcohol.
[4]Emulsion of dioctytylin dilaurate at 37.5% by weight in water, prepared using polyvinyl alcohol as surfactant.

The lubricant composition of Table 1 was prepared as indicated below.

A mixture composed of the unreactive polydimethylsiloxane (a) of low viscosity, the reactive oil (b), the methyltriethoxysilane (c), the surfactant (e) and some of the distilled water (in a water/surfactant ratio of 1.2) is prehomogenized with moderate stirring for 15 minutes at room temperature.

The mixture thus obtained is treated by grinding until phase inversion takes place, using a Moritz® mill, to change from a water/oil fluid phase to an oil/water thick phase.

The thick phase obtained is diluted with moderate stirring for 40 minutes, using the remaining amount of distilled water to obtain an emulsion whose solids content is 50% by weight. The bactericide and the antioxidant are added during the dilution. The silane (d) and the catalyst (f) in emulsion form are added at the end of dilution and homogenization is performed with moderate stirring for 10 minutes, followed by filtration.

The emulsion obtained is characterized by a mean particle size of 0.485 μm and a solids content proportion (60 min, 120° C.) of 49.4% by weight.

COMPARATIVE EXAMPLE

This example illustrates a composition not containing the water-soluble crosslinking agent (d) and is consequently not in accordance with the invention.

The formulation of this composition is given in the table below.

TABLE 2

| Nature of the constituent | Identification | Weight percentage in the emulsion |
|---|---|---|
| Polydimethylsiloxane of example 1 | Constituent (a) | 35.19 |
| α,ω-dihydroxypolydimethyl-siloxane of example 1 | Constituent (b) | 11.90 |
| Methyltriethoxysilane of example 1 | Constituent (c) | 0.329 |
| Polyethoxylated isotridecyl alcohol of example 1 | Constituent (e) | 2.783 |
| Dioctyltin dilaurate emulsion | Constituent (f) | 0.25 |
| Bactericide | | 0.0199 |
| Antioxidant | | 0.0498 |
| Distilled water | | 49.476 |
| | | 100 |

This composition is prepared as in example 1, except that the step of adding the silane (d) is omitted.

The emulsion obtained is characterized by a mean particle size of 0.485 μm and a solids content proportion (60 min, 120° C.) of 49.4% by weight.

EXAMPLE 2

In this example, the durability of the lubricant properties of the compositions of example 1 according to the invention and of the comparative example are compared.

The durability of a lubricant composition corresponds to the number of tires produced without degradation of the surface of the inflatable bag. An inflatable bag film, pretreated with the lubricant composition to be assessed, is pressed in contact with a nonvulcanized tire cover film, in a series of pressure and temperature cycles simulating the steps in the manufacture of a tire on an industrial tool.

The tire cover film is replaced after each molding. The test is complete when the two surfaces in contact remain stuck together. The lubricant composition at the surface of the inflatable bag film is depleted and no longer acts as a lubricant interface.

Table 3 shows the durability of the compositions of example 1 and of the comparative example.

TABLE 3

| Example | Durability |
|---|---|
| Example 1 | 7 |
| Comparative example | 0 |

The better durability of the composition of the invention is clearly seen from this comparison.

What is claimed is:

1. Siloxane-based lubricant composition, in the form of an oil-in-water emulsion, that does not release hydrogen, comprising:
   (a) an unreactive polydiorganosiloxane oil with lubricant properties, having a dynamic viscosity from about $5 \times 10^{-2}$ to $30 \times 10^2$ Pa.s at 25° C.;
   (b) a reactive linear polydiorganosiloxane oil containing at least two OH groups per molecule, said polydiorganosiloxane having a dynamic viscosity at 25° C. of between $5 \times 10^{-2}$ and $10 \times 10^2$ Pa.s;
   (c) a crosslinking agent that is soluble in the silicone phase, comprising at least two functions capable of reacting with the reactive polydiorganosiloxane oil (b);
   (d) a water-soluble crosslinking agent selected from the group consisting of hydroxylated silanes and/or polydiorganosiloxanes, said crosslinking agent bearing at least one hydroxyl group and at least one organic group containing an Fr function per molecule, Fr representing an optionally substituted amino, epoxy, optionally substituted methacroyl, optionally substituted acroyl, optionally substituted ureido, optionally substituted thiol or halo function;
   (e) a surfactant;
   (f) a condensation catalyst capable of catalyzing the r action of the oil (b) with the crosslinking agent (c) and/or (d); and
   (g) water, said composition comprising:
      from 5 to 95 parts by weight of the constituent (a);
      from 1 to 50 parts by weight of the constituent (b);
      from 0.1 to 20 parts by weight of the constituent (c);
      from 0.5 to 15 parts by weight of the constituent (d);
      from 0.05 to 10 parts by weight of the constituent (f);
      per 100 parts by weight of the sum of the constituents (a) (b)+(c)+(d)+(f);
      the amounts of surfactants and of water being sufficient to obtain an oil-in-water emulsion; wherein the comoositior does not comprise a polyorganosiloxane resin that is soluble in the silicone phase and bearing, before emulsification, condensable hydroxyl substituents.

2. The composition as claimed in claim 1, wherein the constituent (a) is a linear polydiorganosiloxane containing repeating units of formula $(R)_2SiO_{2/2}$, ending at its chain ends with units $(R)_3SiO_{1/2}$, in which R is a monovalent organic group selected from the group consisting of alkyl, alkenyl, aryl, cycloalkyl, cycloalkenyl, aralkyl and alkaryl.

3. The composition as claimed in claim 2, wherein the constituent (a) is a polydimethylsiloxane.

4. The composition as claimed in claim 1, wherein said constituent (b) has the formula:

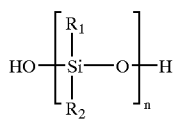

in which n is an integer greater than or equal to 10, $R_1$ and $R_2$, which may be identical or different, represent —OH, alkyl, cycloalkyl, alkenyl, cycloalkenyl or amino.

5. The composition as claimed in claim 1, wherein the constituent (c) is selected from the group consisting of organotrialkoxysilanes, organotriacyloxysilanes, organotrioximosilanes and tetraalkyl silicates.

6. The composition as claimed in claim 5, wherein the constituent (c) is an alkyltrialkoxysilane of formula $YsiZ_3$ in which Y is alkyl and Z is alkoxy.

7. The composition as claimed in claim 1, wherein the constituent (d) has the formula $R_2R_1N—R_a—Si(OH)_3$ in which $R_a$ represents alkylene and $R_1$ and $R_2$ represent a hydrogen atom or an alkyl group.

8. The composition as claimed in claim 1, wherein said catalyst (f) is a tin catalyst.

9. The composition as claimed in claim 8, wherein the catalyst (f) is a dialkyltin dicarboxylate.

10. The composition as claimed in claim 1, wherein it also comprises a film-forming polymer.

11. The composition as claimed in claim 1, which comprises from 40% to 95% by weight of water.

12. The composition as claimed in claim 1, which comprises from 0.5% to 10% by weight of surfactant.

13. A process for preparing a lubrican composition as claimed in claim 1, comprising the steps comprising preparing an aqueous emulsion of the constituents (a), (b) and (c), in the presence of the surfactant (e), followed by adding to said emulsion the missing constituents (d) and (f) either directly or in the form of an aqueous emulsion.

14. An article coated with a composition as claimed in claim 1.

15. An article which may be obtained by heating an article as claimed in claim 14.

16. A dilatable rubber bag coated on it outer surface with a composition as claimed in claim 1, for molding and vulcanizing tire or semi-tire casings.

17. A dilatable rubber bag which may be obtained by heating a bag as claimed in claim 16 to a temperature of from 80 to 150° C.

18. An uncured tire or semi-tire casing including elements that will constitute its outer tread intended to come into contact with the ground, coated on its inner surface with a composition as claimed in claim 1.

19. A method for lubricating an article comprising lubricating the article with the lubricant composition as claimed in claim 1.

20. A method for lubricating a dilatable rubber vulcanization bag when molding and vulcanizing tire or semi-tire casings comprising lubricating the dilatable rubber vulcanization bag with the lubricant composition according to claim 1.

* * * * *